United States Patent
Brakes et al.

(10) Patent No.: US 10,569,858 B2
(45) Date of Patent: Feb. 25, 2020

(54) LOCKING DEVICE

(71) Applicant: Airbus Operations Limited, Bristol (GB)

(72) Inventors: David Brakes, Bristol (GB); Eric Wildman, Bristol (GB)

(73) Assignee: Airbus Operations Limited, Bristol (GB)

(*) Notice: Subject to any disclaimer, the term of this patent is extended or adjusted under 35 U.S.C. 154(b) by 237 days.

(21) Appl. No.: 15/849,583

(22) Filed: Dec. 20, 2017

(65) Prior Publication Data

US 2018/0170519 A1 Jun. 21, 2018

(30) Foreign Application Priority Data

Dec. 21, 2016 (GB) .................... 1621811.7

(51) Int. Cl.
*B64C 3/56* (2006.01)
*B64C 3/58* (2006.01)
*B64C 3/42* (2006.01)

(52) U.S. Cl.
CPC .............. *B64C 3/56* (2013.01); *B64C 3/58* (2013.01); *B64C 3/42* (2013.01)

(58) Field of Classification Search
CPC ...... B64C 3/56; B64C 3/546; B64C 2003/543
See application file for complete search history.

(56) References Cited

U.S. PATENT DOCUMENTS

| 2,290,850 | A |   | 7/1942 | Umschweif |   |
|---|---|---|---|---|---|
| 4,647,245 | A | * | 3/1987 | Konsevich | F16B 4/004 248/632 |
| 4,717,094 | A |   | 1/1988 | Chee |   |
| 5,381,986 | A | * | 1/1995 | Smith | B64C 3/56 244/49 |
| 2012/0014741 | A1 |   | 1/2012 | Zamora Gomez |   |
| 2013/0056579 | A1 |   | 3/2013 | Schlipf et al. |   |
| 2016/0251075 | A1 |   | 9/2016 | Thompson et al. |   |

FOREIGN PATENT DOCUMENTS

| DE | 20 2012 002 172 | 5/2012 |
| EP | 2857309 | 4/2015 |
| GB | 2536448 | 9/2016 |
| WO | WO 2015/150835 | 10/2015 |

OTHER PUBLICATIONS

Combined Search and Examination Report for GB1621811.7 dated Jun. 20, 2017, 6 pages.

* cited by examiner

*Primary Examiner* — Richard G Davis
(74) *Attorney, Agent, or Firm* — Nixon & Vanderhye P.C.

(57) ABSTRACT

An aircraft wing comprises a fixed wing, and a wing tip device at the tip thereof. The wing tip device is configurable between (i) a flight configuration for use during flight, and (ii) a ground configuration for use during ground based operations. In the ground configuration with span of the wing is reduced. The wing further comprises a locking mechanism including a locking pin with a longitudinal axis, the locking pin associated with one of the fixed wing and the wing tip device, and a bush associated with the other of the fixed wing and wing tip device, the bush configured to receive the locking pin. The bush is located within a bush housing arranged to allow relative movement of the bush in the direction of the longitudinal axis of the locking pin when the locking pin is received within the bush.

14 Claims, 6 Drawing Sheets

LOCKING DEVICE

RELATED APPLICATION

This application claims priority to United Kingdom (GB) patent application 1621811.7, filed Dec. 21, 2016, the entire contents of each of which are hereby incorporated by reference.

BACKGROUND OF THE INVENTION

There is a trend towards increasingly large passenger aircraft, for which it is desirable to have correspondingly large wing spans. However, the maximum aircraft span is effectively limited by airport operating rules which govern various clearances required when manoeuvring around the airport (such as the span and/or ground clearance required for gate entry and safe taxiway usage).

Therefore, wing tip devices have been introduced into passenger aircraft, where a wing tip device is movable between a flight configuration for use during flight, and a ground configuration for use during ground-based operations. In the ground configuration, the wing tip device is moved away from the flight configuration such that the span of the aircraft wing is reduced, thereby allowing use of existing gates and safe taxiway usage.

In order to securely fasten the wing tip device in the flight configuration, one or more locking mechanisms must be used. However, conventional locking mechanisms may not provide the secure fastening required for a wing tip. In particular, wear in a locking mechanism may result in there being play between the wing tip device and the fixed wing of the aircraft when in the flight configuration. Play may add to wear in the connection between the wing tip device and the fixed wing. Alternatively or additionally, play in the wing tip device may result in vibrations travelling down the fixed wing to the aircraft fuselage.

The present invention seeks to mitigate the above-mentioned problems. Alternatively or additionally, the present invention seeks to provide an improved wing tip device and locking mechanism.

SUMMARY OF THE INVENTION

The present invention provides, according to a first aspect, an aircraft wing comprising: a fixed wing, and a wing tip device at the tip thereof, wherein the wing tip device is configurable between (i) a flight configuration for use during flight, and (ii) a ground configuration for use during ground based operations, wherein in the ground configuration the wing tip device is moved away from the flight configuration such that the span of the aircraft wing is reduced, the aircraft wing further comprising a locking mechanism for locking the wing tip device in the flight configuration, the locking mechanism comprising a locking pin with a longitudinal axis, the locking pin associated with one of the fixed wing and the wing tip device, the locking mechanism further comprising a bush associated with the other of the fixed wing and wing tip device, the bush configured to receive the locking pin when the wing tip device is in the flight configuration such that movement of the wing tip device out of the flight configuration is prevented, the bush located within a bush housing arranged to allow relative movement of the bush in the direction of the longitudinal axis of the locking pin when the locking pin is received within the bush, wherein the frictional force to be overcome to allow movement of the bush relative to the bush housing in the direction of the longitudinal axis is less than the frictional force to be overcome to allow movement of the locking pin relative to the bush in the direction of the longitudinal axis.

If the locking pin is associated with the wing tip device, the locking pin moves with the wing tip device between the flight configuration and ground configuration. If the locking pin is associated with the fixed wing, the locking pin remains in position relative to the fixed wing when the wing tip device moves from the flight configuration to ground configuration. If the bush is associated with the wing tip device, the bush moves with the wing tip device between the flight configuration and ground configuration. If the bush is associated with the fixed wing, the bush remains in position relative to the fixed wing when the wing tip device moves from the flight configuration to ground configuration.

The locking pin may be located within a socket, the socket forming part of the wing tip device or the fixed wing. The locking pin may be moved relative to the socket in order to locate the locking pin within the bush. The frictional force to be overcome to allow movement of the locking pin relative to the socket in the direction of the longitudinal axis may be greater than the frictional force to be overcome to allow movement of the bush relative to the bush housing in the direction of the longitudinal axis.

The arrangement of the bush and bush housing provides a low-friction slip path, such that any loads on the locking mechanism parallel to the longitudinal axis of the locking pin result in the movement of the bush relative to the bush housing, rather than movement of the locking pin relative to the bush. Such an arrangement may prevent the locking pin and/or bush being unduly worn by loads being transferred to the locking mechanism, for example due to wing distortion under bending or vibration. The interface between the locking pin and the bush may be relatively high friction, meaning that significant heat and wear could be produced by phenomena such as wing vibration causing relative movement between the locking pin and the bush. There may be a low friction interface between the bush and bush housing to provide the low friction slip path.

The locking pin may be associated with an actuator. The actuator may be arranged to move the locking pin into and out of engagement with the bush. The provision of a low friction slip path between the bush and bush housing may prevent loads in the direction of the longitudinal axis of the locking pin being transferred to the actuator. For example, the locking mechanism may experience various loads during flight, such as loads caused by wing vibration. The present invention acts to protect the actuator from such loads, and may enable a smaller, and lighter, actuator to be used while still providing a suitably secure locking mechanism. The movement of the bush relative to the bush housing may be plus or minus 2 mm from a centre point.

The wing tip device and the fixed wing may be separated along an oblique cut plane passing through the upper and lower surfaces of the wing, the oblique cut plane being orientated normal to the axis of rotation. The oblique plane and the axis of rotation may be such that the fixed wing and the wing tip device do not clash when rotating between the flight and ground configurations. An example of a wing tip device that is rotatable in this manner is shown in WO 2015/150835. The orientation of the axis is preferably such that when the wing tip device is rotated about the axis, from the flight configuration to the ground configuration, the span of the aircraft wing is reduced.

The cut plane may be oblique. The distance, along the upper surface of the wing, from the root of the wing to the cut plane (i.e. to where the cut plane intersects the upper surface) may be less than the distance, along the lower surface of the wing, from the root of the wing to the cut plane (i.e. to where the cut plane intersects the lower surface). Thus, the cut plane may create an overcut with respect to the fixed wing. In other embodiments, the distance, along the upper surface of the wing, from the root of the wing to the cut plane (i.e. to where the cut plane intersects the upper surface) may be more than the distance, along the lower surface of the wing, from the root of the wing to the cut plane (i.e. to where the cut plane intersects the lower surface). Thus, the cut plane may create an undercut with respect to the fixed wing. The distance, along the leading edge of edge of the wing, from the root of the wing to where the cut plane intersects the leading edge, may be greater than the distance, along the trailing edge of the wing, from the root of the wing to where the cut plane intersects the trailing edge. Alternatively, the distance, along the trailing edge of the wing, from the root of the wing to where the cut plane intersects the trailing edge, may be greater than the distance, along the leading edge of the wing, from the root of the wing to where the cut plane intersects the leading edge.

The oblique cut plane is preferably a notional plane separating the fixed wing and the wing tip device (for example a cut plane created during the design phase of the wing). It will be appreciated that the cut plane need not necessarily manifest itself as a physical, planar, surface throughout the depth of the wing.

The axis of rotation may be orientated at an angle to (i.e. not including being parallel or perpendicular to) a longitudinal direction. The axis is preferably at an angle to (i.e. not including being parallel or perpendicular to) a lateral direction. The axis is preferably at an angle to (i.e. not including being parallel or perpendicular to) a vertical direction. The vertical, longitudinal and lateral directions may be mutually perpendicular. In some embodiments, the longitudinal, lateral and vertical directions may be in an absolute frame of reference (i.e. longitudinal is fore-aft, lateral is port-starboard and vertical is vertical from the ground). The longitudinal direction may be a chordwise direction; the lateral direction may be a spanwise direction. In other embodiments, it may be appropriate to use the longitudinal, lateral and vertical directions in a frame of reference local to the wing. For example, for a swept wing the longitudinal direction may instead be along the length of the wing, and the lateral direction may be along the width of the wing (i.e. from the leading to the trailing edges, measured perpendicular to the longitudinal direction). Alternatively or additionally, for a wing with dihedral, the vertical direction may be perpendicular to the plane of the wing.

The wing tip device is preferably rotatable about a single axis of rotation. For example, the rotation of the wing tip device is preferably not the result of a compound rotation (I.e. a net rotation created by a plurality of separate rotations about separate axes).

The angle is preferably an oblique angle. The axis is preferably at an angle of less than 45 degrees, and more preferably less than 25 degrees, from the vertical. The axis may be at an angle of 15 degrees from the vertical axis. The present invention has been found to be especially beneficial in embodiments in which the axis is at a relatively small angle from the vertical because the orientation of axis results in a shallow cut plane and the area of the interface between the fixed wing and wing tip device may therefore be relatively large.

The oblique cut plane may be a primary cut plane. When the wing tip device is in the flight configuration, the outer end of the fixed wing and the inner end of the wing tip device may meet along an interfacing cut line that separates the outer surfaces of the fixed wing and the wing tip device. The interfacing cut line may comprise: (i) a first length, formed by a cut through the outer surface in a first plane that is parallel to the primary cut plane but offset from the primary cut plane in a first direction; (ii) a second length, formed by a cut through the outer surface in a second plane that is parallel to the primary cut plane but offset from the primary cut plane in a second direction, opposite to the first direction; and (iii) a transition section over which the interfacing cut line transitions from the first length to the second length. The interfacing cut line may be arranged such that when the wing tip device rotates from the flight configuration to the ground configuration, the wing tip device contacts the fixed wing at a sliding contact along the transition section, but the wing tip device separates away from the fixed wing along the first length and second length. Embodiments have been found to be especially beneficial in such an arrangement because a thin skin in the vicinity of the interface tends to be especially important.

The fixed wing and wing tip device may be joined by a rotational joint. The rotational joint may comprise a slew ring. The slew ring may comprise an inner race, connected to one of the fixed wing and wing tip device, and an outer race, connected to the other of the fixed wing and wing tip device. A rotary geared actuator may be arranged such that it may actuate relative rotational movement between the inner race and outer race. Such relative rotational movement may drive the wing tip device between the flight configuration and ground configuration. The locking mechanism may be located within the internal radius of the slew ring, such that it may lock the inner slew ring in position relative to the outer slew ring. For example, the bush may form part of the inner race, such that when the locking pin extends into the bush, rotational movement of the inner race relative to the outer race is obstructed. Alternatively, the locking mechanism may be located outside the slew ring. The fixed wing and wing tip device may comprise structural components which make up the rotational joint between the fixed wing and wing tip device. The locking mechanism may be associated with those structural components, such that locking the locking mechanism prevents relative rotational movement of the structural components. The invention may be particularly advantageous when applied to locking such structural components together, as those components may experience significant vibrational loads, or relative displacement during wing bending or twist. For example, such component may experience relative vertical movement of plus or minus 2 mm, or more, during flight. That relative vertical movement, in the absence of the low friction slip path provided between the bush and bush housing, would result in loading of the locking pin in the vertical direction, and potentially damage the actuator which moves the locking pin into and out of the locked position, or require the actuator to be significantly larger, and/or cause wearing of the locking pin and bush.

The bush may comprise an aperture shaped to receive the locking pin. The aperture may be a slot, for example an elongated slot such as an obround slot. The slot may extend in a direction radially away from the rotation of axis of the wing tip device. The slot may have a width that closely matches the width of the locking pin. Such an arrangement may provide a certain level of tolerance for locating the locking pin, so that the locking pin does not have to be precisely aligned with the centre of the slot in order to be received by the bush. Such misalignment may, for example, be as a result of different thermal expansion characteristics of the wing components. The locking pin may comprise flatted edge portions. The flattened edge portions may correspond with the flattened edges of the obround slot. The flattened edge portions may provide a greater contact surface with the obround slot than provided by a high clearance pin with a circular cross section in a circular hole. The greater contact surface may reduce point stresses experienced by the locking pin due to shear forces acting on the locking mechanism. The flattened edge portions may also allow there to be a greater clearance between the locking pin and the bush, whilst still providing an efficient and significant level of surface contact between the locking pin and the bush. The locking pin may be obstructed by the bush such that any rotational movement of the wing tip device around the rotational axis of the wing tip device is prevented. The locking pin may comprise a tapered end section to assist in location of the pin within the bush.

The interface between the bush and the bush housing may comprise one or more flexible washers, for example Belleville washers. The interface between the bush and the bush housing may comprise one or more O-rings, for example rubber O-rings. The bush and bush housing may have an equilibrium state, in which no external load is being exerted on the bush. The relative movement of the bush and bush housing may be to either side of the equilibrium state, in a direction parallel to the longitudinal axis of the locking pin, when the locking pin is located within the bush.

The interface between the bush and the bush housing may allow relative rotational movement between the bush and bush housing. The relative rotational movement may be limited to a small angle of rotation, for example, 1 degree or less. There may be an alignment key between the bush and bush housing to govern the allowed relative rotational movement between the bush and bush housing. The relative rotational movement between the bush and bush housing may be in a plane approximately perpendicular to the longitudinal axis of the locking pin when the locking pin is located within the bush.

Alternative arrangements between the fixed wing and the wing tip device include folding wing tip devices which may be actuated around a fold line between the flight configuration and ground configuration. Yet another arrangement includes wing tip devices which pivot around a pivot point between the flight configuration and ground configuration. The movement of the wing tip device around the pivot may be towards the front or rear of the aircraft.

In the flight configuration, the span may exceed an airport compatibility limit. In the ground configuration the span may be reduced such that the span (with the wing tip device in the ground configuration) is less than, or substantially equal to, the airport compatibility limit. The airport compatibility limit is a span limit (for example relating to clearance restrictions for buildings, signs, other aircraft). The compatibility limit is preferably a gate limit.

The wing tip device may be a wing tip extension; for example the wing tip device may be a planar tip extension. In other embodiments, the wing tip device may comprise, or consist of, a non-planar device, such as a winglet.

In the flight configuration the trailing edge of the wing tip device is preferably a continuation of the trailing edge of the fixed wing. The leading edge of the wing tip device is preferably a continuation of the leading edge of the fixed wing. There is preferably a smooth transition from the fixed wing to the wing tip device. It will be appreciated that there may be a smooth transition, even where there are changes in sweep or twist at the junction between the fixed wing and wing tip device. However, there are preferably no discontinuities at the junction between the fixed wing and wing tip device. The upper and the lower surfaces of the wing tip device may be continuations of the upper and lower surfaces of the fixed wing.

When the wing tip device is in the ground configuration, the aircraft incorporating the wing, may be unsuitable for flight. For example, the wing tip device may be aerodynamically and/or structurally unsuitable for flight in the ground configuration. The aircraft is preferably configured such that, during flight, the wing tip device is not moveable to the ground configuration. The aircraft may comprise a sensor for sensing when the aircraft is in flight. When the sensor senses that the aircraft is in flight, a control system is preferably arranged to disable the possibility of moving the wing tip device to the ground configuration.

The aircraft is preferably a passenger aircraft. The passenger aircraft preferably comprises a passenger cabin comprising a plurality of rows and columns of seat units for accommodating a multiplicity of passengers. The aircraft may have a capacity of at least 20, more preferably at least 50 passengers, and more preferably more than 50 passengers. The aircraft is preferably a powered aircraft. The aircraft preferably comprises an engine for propelling the aircraft. The aircraft may comprise wing-mounted, and preferably underwing, engines.

According to a second aspect of the invention there is also provided an aircraft, the aircraft comprising an aircraft wing as described with regards to the first aspect of the invention.

According to a third aspect of the invention there is also provided a locking mechanism, the locking mechanism comprising a locking pin with a longitudinal axis, and a bush, the bush configured to receive the locking pin such that movement of the locking pin in a direction perpendicular to the longitudinal axis of the locking pin is prevented, the bush located within a bush housing arranged to allow relative movement of the bush in the direction of the longitudinal axis of the locking pin when the locking pin is received within the bush, wherein the frictional force to be overcome to allow movement of the bush relative to the bush housing in the direction of the longitudinal axis is less than the frictional force to be overcome to allow movement of the locking pin relative to the bush in the direction of the longitudinal axis.

According to a fourth aspect of the invention, there is provided a method of locking an aircraft wing according to the first aspect of the invention in a flight configuration, the method comprising the steps of: moving the wing tip device into the flight configuration, and moving the locking pin into the bush, such that movement of the wing tip device out of the flight configuration is prevented.

According to a fifth aspect of the invention, there is provided a method of unlocking an aircraft wing, the aircraft wing locked according to the fourth aspect of the invention, the method comprising the steps of: moving the locking pin out of the bush, such that movement of the wing tip device out of the flight configuration is allowed.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

Figure 1:
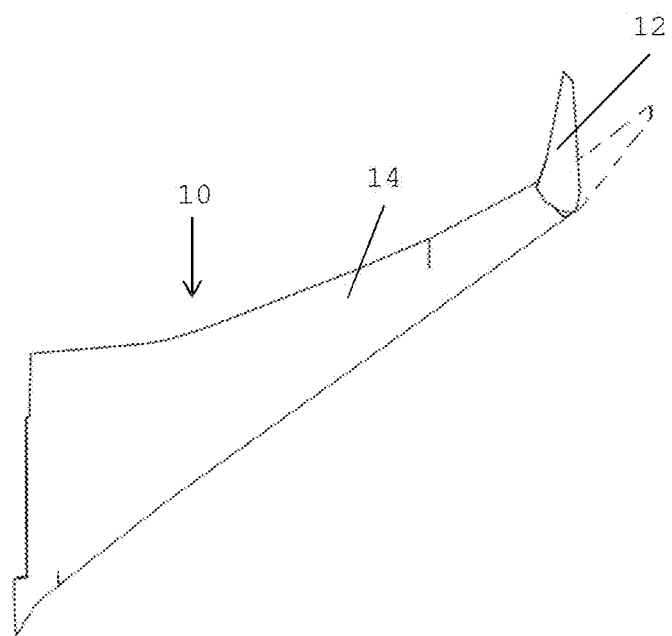
FIG. 1 shows a schematic view of an aircraft wing according to a first embodiment of the invention.

FIG. 1 shows an aircraft wing 10 comprising a fixed wing 12 and a wing tip device 14 at the tip thereof. The wing tip device 14 is configurable between a flight configuration (shown in dashed lines), suitable for flight, and a ground configuration (shown in solid lines), suitable for ground based operations, e.g. with the wing span within gate limits. When in the ground configuration, the span of the aircraft wing is reduced compared to the flight configuration.

Figure 2:
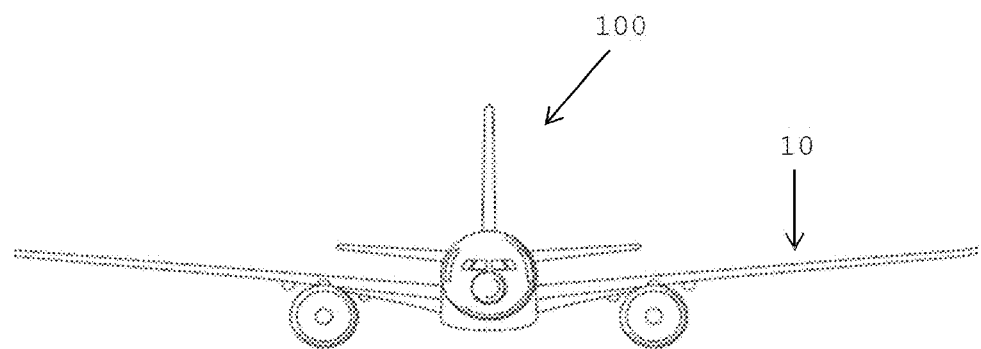
FIG. 2 shows an aircraft comprising the aircraft wing as shown in FIG. 1.

FIG. 2 shows an aircraft 100, comprising a wing 10, as described above.

Figure 3:
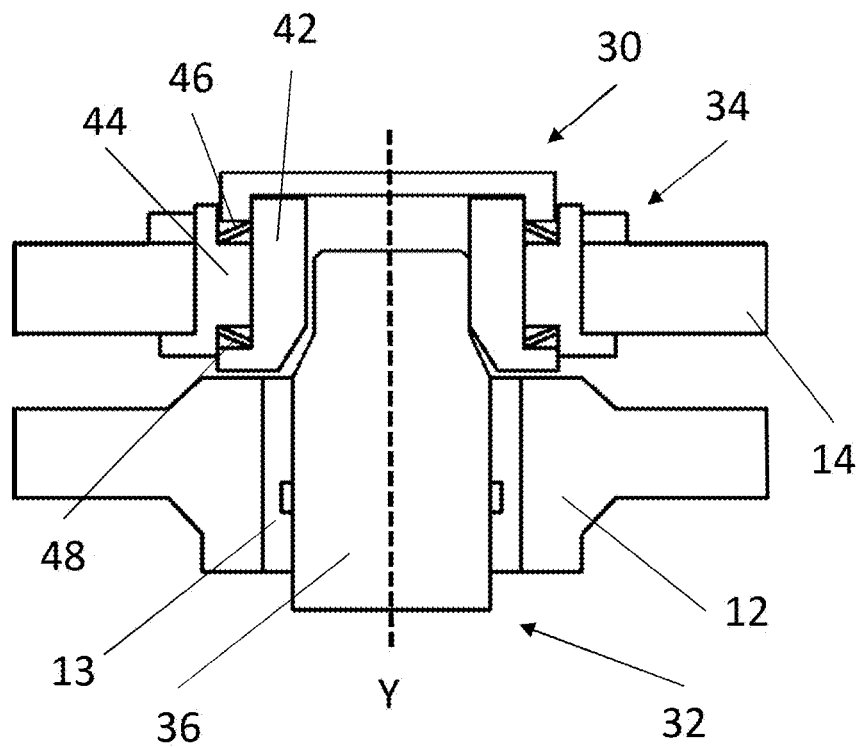
FIG. 3 shows a cross sectional side view of a locking mechanism according to an embodiment of the invention.
Figure 4:
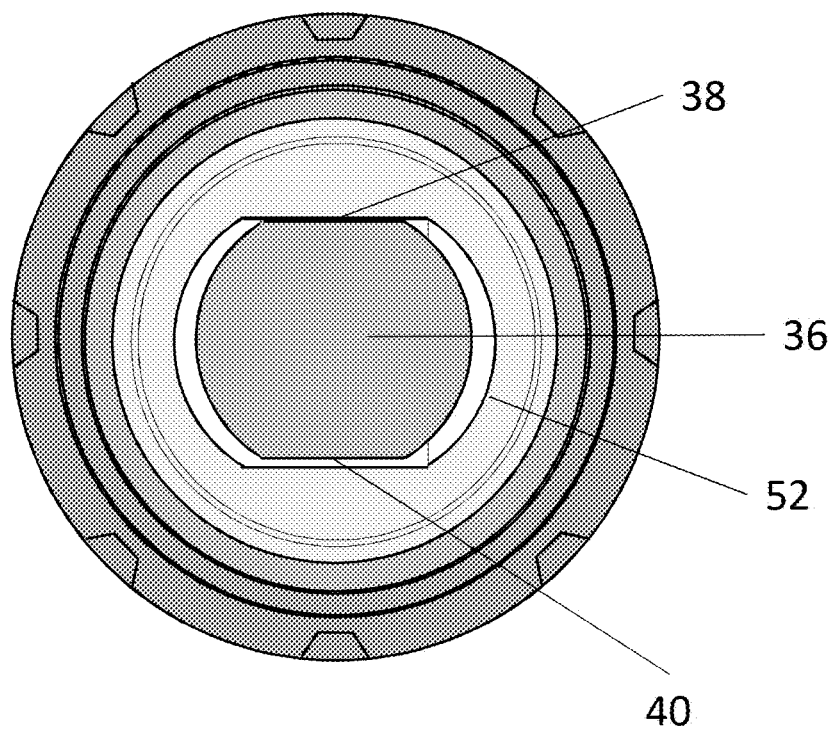
FIG. 4 shows a top plan view of the locking mechanism shown in FIG. 3.
Figure 5:
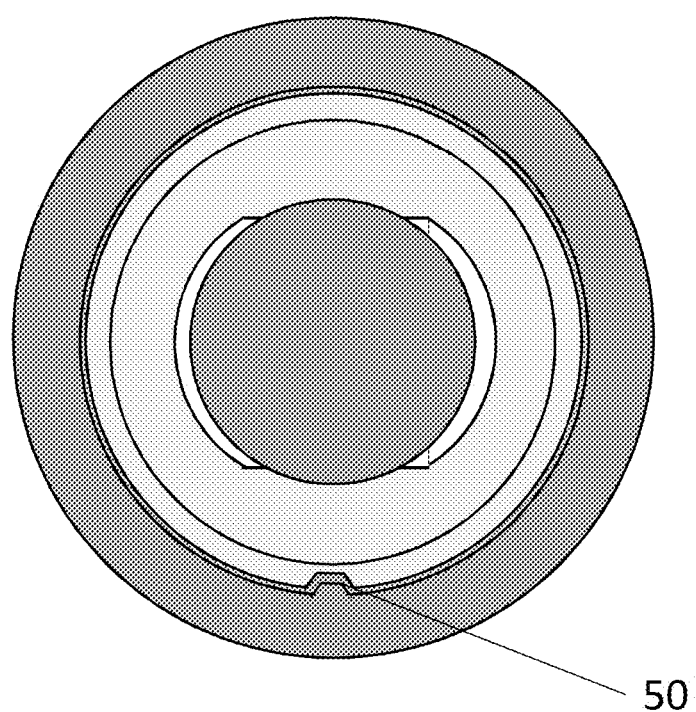
FIG. 5 shows a bottom plan view of the locking mechanism shown in FIG. 3.

FIG. 3 shows a cross section of a locking mechanism 30. The locking mechanism 30 comprises a first part 32 forming part of the fixed wing 12 and a second part forming a part of the wing tip device 14. The first part comprises a male locking pin 36 with a longitudinal axis Y. The male locking pin 36 is roughly cylindrical, though with two opposed flat planar portions 38 and 40, as best shown in FIG. 4. The male locking pin 36 is moved forwards and backwards in the direction of the longitudinal axis Y by an actuator (not shown). The locking pin 36 is located within a socket 13 in the fixed wing 12. The surfaces of the locking pin 36 and the socket 13 are relatively high friction surfaces, such that relative movement of the locking pin 36 and the socket 13 requires a reasonably large frictional force to be overcome when the system is loaded in shear, in particular in comparison to the frictional contact between some other elements of the locking mechanism, as will be described below. The second part 34 comprises a bush 42 which is mounted to a bush housing 44 by a pair of Belleville washers 46 and 48. The Belleville washers 46 and 48 allow a limited amount of movement of the bush 42 relative to the bush housing 44, in a direction parallel to the longitudinal axis Y. The Belleville washers 46, 48, also act to centre the bush 42 in the bush housing 44. There is a low friction interface between the bush 42 and bush housing 44, comprising low friction contact surfaces. The bush housing 44 includes a detent 50 (see FIG. 5), which co-operates with an indent on the bush 42 to allow a limited amount of rotational movement between the bush 42 and bush housing 44 around the longitudinal axis Y. As shown in FIG. 4, the bush 42 comprises an obround aperture 52. The obround aperture 52 will allow for some misalignment between the male locking pin 36 and the centre of the bush 42 whilst still allowing the bush 42 to house the male locking pin 36. The flat portions of the male locking pin 38 and 40 are arranged to contact the flat portions of the obround aperture 52, providing a solid contact surface, and also increasing the surface area of contact between the male locking pin 36 and the bush 42. The contact surfaces of the male locking pin 36 and obround aperture 52 are also arranged to be high friction surfaces, in particular higher friction surfaces than the contact surfaces between the bush 42 and bush housing 44.

The locking mechanism 30 has an unlocked position, in which the male locking pin 36 is not received within the bush 42, and the wing tip device 14 may be moved away from the fixed wing 12, from a flight configuration to a ground configuration. The locking device 30 has a locked position, as shown in FIG. 3, where the male locking pin 36 is located within the bush 42, such that the wing tip device 14 may not be moved relative to the fixed wing 12. In particular, the wing tip device 14 is connected to the fixed wing by a rotational joint, and the movement between the flight configuration and ground configuration is rotational movement. The male locking pin 36, when located in the bush 42, prevents this rotational movement.

In the locked position, as shown in FIG. 3, forces on the fixed wing 12 and wing tip device 14 may cause a relative vibration of the two components. The vibration may result in forces parallel to the longitudinal axis Y being transferred to the locking arrangement 30. The arrangement of the present invention is such that the bush housing 44 and bush 42 provide a low-friction slip path, whereby such vibration results in the relative movement of the bush 42 and bush housing 44 in a direction parallel to the longitudinal axis Y. Therefore, the low-friction slip path reduces or removes the vibrational load which would be experienced by the actuator which drives the male locking pin 36 caused by wing vibration, bending, or twisting. The protection of the actuator in this way means a smaller and/or lighter actuator may be used compared to an actuator which would have to fully tolerate these loads. The reduction or removal of vibrational load between the male locking pin 36 and bush 42 will also reduce the heat created between the two elements, and reduce potential wear of the male locking pin 36 and bush 42.

Figure 6:
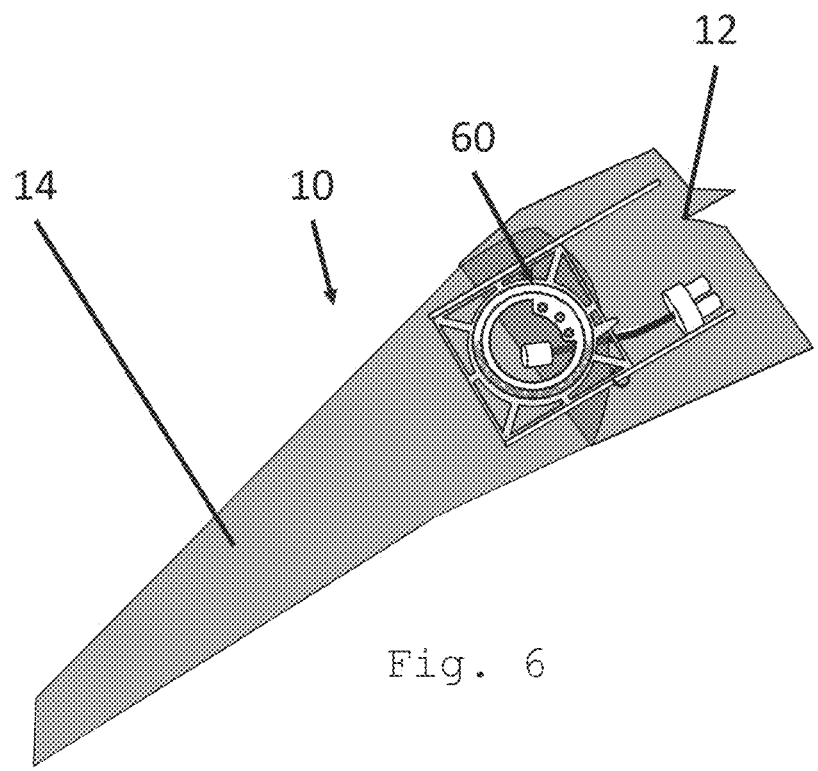
FIG. 6 shows a schematic view of a wing and locking device according to an embodiment of the invention.
Figure 7:
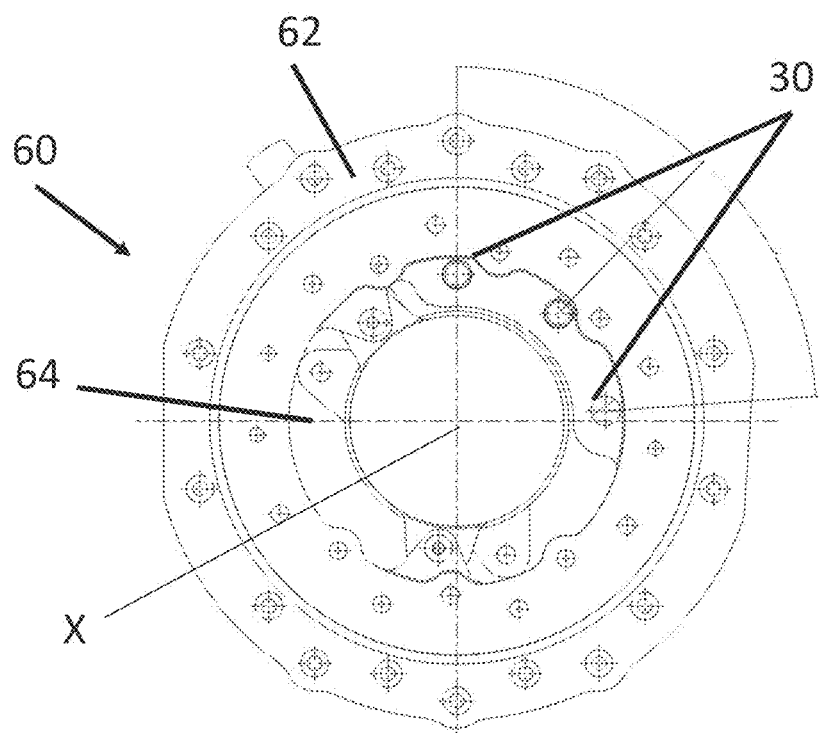
FIG. 7 shows a section of the wing and locking device as shown in FIG. 6.
Figure 8:
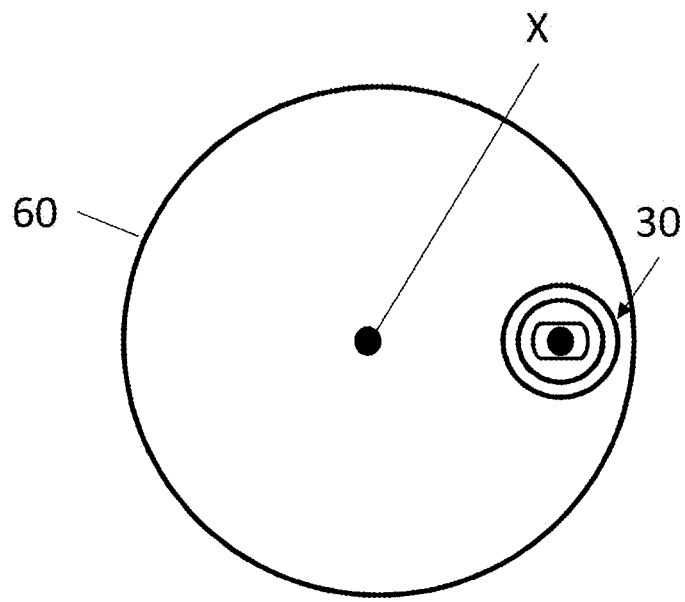
FIG. 8 shows a highly schematic view of the wing and locking device shown in FIGS. 6 and 7, with various elements removed for clarity.

FIGS. 6 and 7 show the relative positions of the fixed wing 12, the wing tip device 14 and the locking device 30. Also shown in FIGS. 6 and 7 is a slew ring 60, which is described in greater detail in GB 1610105.7. The slew ring 60 comprises an outer race 62 and an inner race 64. The outer race 62 is fixed to the fixed wing 12, such that the outer race 62 remains rotationally stationary relative to the fixed wing 12. The inner race 64 is fixed to the wing tip device 14, such that the inner race 64 remains rotationally stationary relative to the wing tip device 14. The slew ring 60 has axis X around which the wing tip device 14 is moved between the flight and ground configurations. Specifically, the inner race 64 is rotated around the axis X relative to the outer race 62, in order to move the wing tip device between the flight and ground configurations. The movement of the inner race 64 relative to the inner race 62 is controlled and driven by a rotary geared actuator. The locking device 30 is used when the wing tip device 14 is in the flight configuration, to prevent any further rotational movement of the wing tip device 14 around the axis X. The bush 42 forms part of the inner race 64. When the wing tip device 14 is in the flight configuration, the bush 42 is in alignment with the male locking pin 32. The male locking pin 32 is then extended into the bush 42, such that rotational movement of the inner race 64 relative to the outer race 62 is prevented. FIG. 8, being a highly simplified version of FIG. 7, shows an outline of a slew ring 60, and the location of the locking mechanism within the slew ring 60. Only a single locking mechanism 30 is shown, in contrast to the two locking mechanisms shown in FIG. 7. FIG. 8 further shows the orientation of the locking mechanism is such that the obround aperture 52 allows radial displacement of the male locking pin 32, whilst still preventing the rotational movement of the wing tip device 14 around the axis X. Such an arrangement may compensate for thermal expansion or contraction altering the relative positions of the male locking pin 32 and the bush 42.

Figure 9:
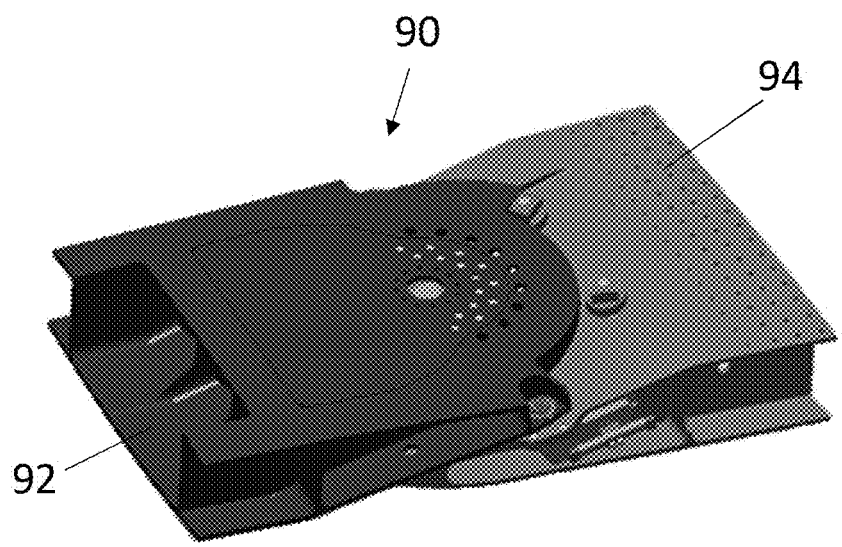
FIG. 9 shows an alternative arrangement of the locking mechanism relative to an aircraft wing.

FIG. 9 shows a schematic view of a rotational joint between a wing tip device and a fixed wing. The rotational joint may comprise a slew ring as described above. The slew ring may connect a wing tip device structural component 92 with a fixed wing structural component 94. Loads on the aircraft wing may result in vibrational, bending, and/or twisting movement of the wing tip device structural component 92 relative to the fixed wing structural component 94. A locking mechanism 30 is associated with the two structural components 92 and 94, such that the locking mechanism 30 may be used to lock the wing tip device structural component 92 in position relative to the fixed wing structural component 94.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

The aircraft wing may comprise a plurality of locking mechanisms dispersed around a slew ring mechanism. Using a plurality of locking mechanisms may increase the security of the wing tip device when the flight configuration, increasing the strength of the fixed wing and wing tip device and/or providing a level of redundancy in case of failure of one of the locking mechanisms.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. An aircraft wing comprising:
a fixed wing, and a wing tip device at the tip of the fixed wing, wherein the wing tip device is configurable between:
(i) a flight configuration for use during flight, and
(ii) a ground configuration for use during ground based operations, wherein in the ground configuration the wing tip device is moved away from the flight configuration such that the span of the aircraft wing is reduced,
a locking mechanism for locking the wing tip device in the flight configuration, the locking mechanism comprising:
a locking pin with a longitudinal axis, the locking pin associated with one of the fixed wing and the wing tip device,
a bush associated with the other of the fixed wing and wing tip device, the bush configured to receive the locking pin when the wing tip device is in the flight configuration such that movement of the wing tip device out of the flight configuration is prevented,
a bush housing within which is the bush and the bush housing arranged to allow relative movement of the bush in the direction of the longitudinal axis of the locking pin when the locking pin is received within the bush,
wherein a frictional force to be overcome to allow movement of the bush relative to the bush housing in the direction of the longitudinal axis is less than a frictional force to be overcome to allow movement of the locking pin relative to the bush in the direction of the longitudinal axis.

2. The aircraft wing as in claim 1, wherein the locking pin is associated with an actuator arranged to move the locking pin into and out of engagement with the bush.

3. The aircraft wing as in claim 1, wherein the wing tip device and the fixed wing are separated along an oblique cut plane passing through the upper and lower surfaces of the wing, the oblique cut plane being orientated normal to the axis of rotation.

4. The aircraft wing as in claim 1, wherein the wing tip device and fixed wing are connected by a rotational joint, and the movement between the flight configuration and ground configuration comprises rotational movement around the rotational axis of the rotational joint.

5. The aircraft wing as in claim 4, wherein the rotational joint comprises a slew ring.

6. The aircraft wing as in claim 5, wherein the slew ring comprises an inner race fixed to one of the fixed wing and wing tip device, and an outer race fixed to the other of the fixed wing and wing tip device, and the bush is configured to stop relative rotational movement of the inner race and outer race when the locking mechanism is in the locked configuration.

7. The aircraft wing as in claim 1, wherein the bush comprises an aperture shaped to receive the locking pin.

8. The aircraft wing as in claim 1, wherein the locking pin comprises flatted edge portions.

9. The aircraft wing as in claim 1, wherein an interface between the bush and the bush housing comprise one or more flexible washers.

10. The aircraft wing as in claim 1, wherein an interface between the bush and the bush housing comprise one or more O-rings.

11. The aircraft wing as in claim 1, wherein an interface between the bush and the bush housing allows relative rotational movement between the bush and bush housing.

12. An aircraft comprising the aircraft wing in claim 1.

13. A method of locking an aircraft wing, the aircraft wing as claimed in claim 1, the method comprising the steps of: moving the wing tip device into the flight configuration, and moving the locking pin into the bush, such that movement of the wing tip device out of the flight configuration is prevented.

14. The method of claim 13, further comprising: moving the locking pin out of the bush, such that movement of the wing tip device out of the flight configuration is allowed.

* * * * *